(12) United States Patent
Sambhy et al.

(10) Patent No.: US 12,325,227 B2
(45) Date of Patent: Jun. 10, 2025

(54) ANTI-CURL SYSTEM FOR A LIQUID INK PRINTER AND METHOD THEREOF

(71) Applicant: XEROX CORPORATION, Norwalk, CT (US)

(72) Inventors: Varun Sambhy, Pittsford, NY (US); Eliud Robles Flores, Rochester, NY (US); David R. Stookey, Walworth, NY (US); Guo-Yau Lin, The Woodlands, TX (US)

(73) Assignee: XEROX CORPORATION, Norwalk, CT (US)

( * ) Notice: Subject to any disclaimer, the term of this patent is extended or adjusted under 35 U.S.C. 154(b) by 175 days.

(21) Appl. No.: 18/166,758

(22) Filed: Feb. 9, 2023

(65) Prior Publication Data

US 2024/0269993 A1 Aug. 15, 2024

(51) Int. Cl.
| | |
|---|---|
| *B41J 11/00* | (2006.01) |
| *B41J 2/21* | (2006.01) |
| *B41M 5/00* | (2006.01) |
| *C09D 11/023* | (2014.01) |
| *C09D 11/033* | (2014.01) |
| *C09D 11/10* | (2014.01) |

(Continued)

(52) U.S. Cl.
CPC .......... *B41J 11/0005* (2013.01); *B41J 2/2114* (2013.01); *B41J 11/0015* (2013.01); *B41M 5/0011* (2013.01); *C09D 11/023* (2013.01); *C09D 11/033* (2013.01); *C09D 11/10* (2013.01); *C09D 11/30* (2013.01); *C09D 11/54* (2013.01); *B41J 2202/21* (2013.01)

(58) Field of Classification Search
CPC ................ B41J 11/0005; B41J 2202/21; B41J 11/0015; B41J 2/2114; C09D 11/023; C09D 11/033; C09D 11/10; C09D 11/30; C09D 11/54; B41M 5/0011
See application file for complete search history.

(56) References Cited

U.S. PATENT DOCUMENTS

| | | |
|---|---|---|
| 5,579,693 A | 12/1996 | Carriera et al. |
| 5,746,814 A | 5/1998 | Malhotra et al. |

(Continued)

FOREIGN PATENT DOCUMENTS

| | | | |
|---|---|---|---|
| DE | 102015102162 A1 | 8/2016 | |
| JP | 2004209759 A | * 7/2004 | ............... B41M 5/00 |

(Continued)

OTHER PUBLICATIONS

Extended European Search Report issued Jul. 5, 2024 in corresponding EP Application No. 24152041.0, 10 pages.

*Primary Examiner* — Yaovi M Ameh
(74) *Attorney, Agent, or Firm* — MH2 Technology Law Group LLP

(57) ABSTRACT

An anti-curl system 1 including a printer configured to deposit a liquid ink and an anti-curl composition onto a print substrate, wherein the liquid ink includes a colorant and is configured for deposit on the print substrate to form a print image, and wherein the anti-curl composition does not include a colorant and is configured for deposit on a non-print area of the print substrate, wherein the non-print area of the print substrate includes at least a portion of a non-print margin area configured for non-deposition of the liquid ink and deposition of the anti-curl composition.

20 Claims, 6 Drawing Sheets

(51) Int. Cl.
    *C09D 11/30*     (2014.01)
    *C09D 11/54*     (2014.01)

(56)     References Cited

U.S. PATENT DOCUMENTS

| | | | |
|---|---|---|---|
| 7,705,069 | B2 | 4/2010 | Reinhardt et al. |
| 2006/0233975 | A1 | 10/2006 | Tran et al. |
| 2009/0256896 | A1 | 10/2009 | Scarlata |
| 2011/0141180 | A1* | 6/2011 | Doi .................. B41J 3/60 |
| | | | 347/101 |
| 2011/0310160 | A1* | 12/2011 | Jogo ................ B41J 29/38 |
| | | | 347/19 |
| 2012/0113205 | A1* | 5/2012 | Link ................ B41M 7/00 |
| | | | 347/104 |
| 2012/0320122 | A1 | 12/2012 | Falser et al. |
| 2021/0252853 | A1* | 8/2021 | Kearns .............. B41J 2/2114 |

FOREIGN PATENT DOCUMENTS

| | | | | |
|---|---|---|---|---|
| JP | 2015058606 A | * | 3/2015 | ............ B41M 5/00 |
| WO | 2013/050080 A1 | | 4/2013 | |

* cited by examiner

ANTI-CURL SYSTEM FOR A LIQUID INK PRINTER AND METHOD THEREOF

TECHNICAL FIELD

The disclosure relates to printing using a liquid ink printer, and more specifically to systems and methods to control curling in substrates printed with an aqueous liquid ink.

BACKGROUND

Liquid ink printers, such as ink-jet printers, are used to deposit ink on a print substrate or recording media, such as paper, to create an image in the form of text and/or graphics. The liquid ink used in these printers often includes colorants or dyes mixed in a liquid vehicle, such as water and/or solvents. After the liquid ink is deposited on the paper, the liquid in the ink can be removed to fix the colorant or dye to the paper. The liquid can be removed by natural evaporation, active heating and drying, by blotting, and the like.

However, deposition of water-containing inks can cause curling in certain print substrates, such as paper. For example, and while not bound to any particular theory or explanation, curl is thought to occur due to differences in state and/or micro-orientation of the paper fibers when wetted versus when dry. In addition, the presence of polymers, such as latex, in the liquid ink may also change the stresses on the paper fibers between inked and non-inked areas. The difference in paper fiber stress leads to curling. For example, stresses can cause the paper fibers to curl away from the printed image right after printing and/or curl towards the printed image over a period of time as the paper fibers try to achieve a state of final stress release after being dried.

Accordingly, there is a need for systems and methods to control curling in sheets printed with liquid inks.

BRIEF SUMMARY

This summary is intended merely to introduce a simplified summary of some aspects of one or more implementations of the present disclosure. This summary is not an extensive overview, nor is it intended to identify key or critical elements of the present teachings, nor to delineate the scope of the disclosure. Rather, its purpose is merely to present one or more concepts in simplified form as a prelude to the detailed description below.

The foregoing and/or other aspects and utilities exemplified in the present disclosure may be achieved by providing an anti-curl system including a printer configured to deposit a liquid ink and an anti-curl composition onto a print substrate, wherein the liquid ink includes a colorant and is configured for deposit on the print substrate to form a print image, and wherein the anti-curl composition does not include a colorant and is configured for deposit on a non-print area of the print substrate, wherein the non-print area of the print substrate comprises at least a portion of a non-print margin area configured for non-deposition of the liquid ink.

The printer can be configured to deposit the liquid ink solely on print areas of the print substrate, and the printer can be configured to deposit the anti-curl composition solely on non-print areas of the print substrate.

The printer can be an ink-jet printer including at least one ink-jet printing head, and the at least one ink-jet printing head can be configured to deposit the liquid ink and the anti-curl composition on the print substrate.

The liquid ink and the anti-curl composition can be deposited on the print substrate contemporaneously by the at least one ink-jet printing head.

Both the liquid ink and the anti-curl composition can be aqueous compositions, both the liquid ink and the anti-curl composition each can include a latex polymer, the anti-curl composition does not include a colorant, and the anti-curl composition can be configured to be clear when dried.

The anti-curl composition can include water, co-solvent, surfactant, and latex polymer, and the liquid ink can include water, co-solvent, surfactant, latex polymer, and a colorant.

The anti-curl composition and the liquid ink can include a same type and a same amount of at least one of co-solvent, surfactant, and latex polymer.

The anti-curl composition can have from about 2 times to about 5 times less latex polymer than the liquid ink.

The anti-curl composition can be deposited at a lower deposition density on the print substrate than the liquid ink.

The foregoing and/or other aspects and utilities exemplified in the present disclosure may also be achieved by providing a method to control curling on a print substrate including depositing liquid ink on a print substrate, and depositing an anti-curl composition on the print substrate, wherein the liquid ink is deposited solely on print areas of the print substrate and the anti-curl composition is deposited solely on non-print areas of the print substrate, where deposition of the anti-curl composition on non-print areas of a print substrate is configured to control or minimize the curl caused by deposition of the liquid ink on print areas of the print substrate, and wherein the anti-curl composition is deposited at least on a portion of a non-print margin area configured for non-deposition of the liquid ink.

The anti-curl composition can be deposited on the print substrate contemporaneously with the liquid ink, and the liquid ink and the anti-curl composition can be deposited on the print substrate via a same printing apparatus.

Both the liquid ink and the anti-curl composition can be aqueous compositions, and both the liquid ink and the anti-curl composition can each include a latex polymer.

The anti-curl composition does not include a colorant, and the anti-curl composition can be configured to be clear when dried.

The anti-curl composition can include water, co-solvent, surfactant, and latex polymer, and the liquid ink can include water, co-solvent, surfactant, latex polymer, and a colorant.

The print substrate can include a paper with a paper weight of about 60 gsm or less.

Depositing liquid ink on a print substrate can include depositing liquid ink on print areas of the print substrate and does not include depositing liquid ink on non-print areas of the print substrate, and the non-print areas of the print substrate can include at least one of a non-print margin area and one or more interior non-print areas.

Depositing an anti-curl composition on the print substrate can include depositing the anti-curl composition on non-print areas of the print substrate.

The anti-curl composition can have from about 2 times to about 5 times less latex polymer than the liquid ink.

The anti-curl composition can be deposited at a lower deposition density on the print substrate than the liquid ink.

At least one of a type or an amount of latex polymer in the anti-curl composition can be different than a type or an amount of latex polymer in the liquid ink.

Further areas of applicability will become apparent from the detailed description provided hereinafter. It should be understood that the detailed description and specific examples, while indicating the preferred implementation of the invention, are intended for purposes of illustration only and are not intended to limit the scope of the invention.

BRIEF DESCRIPTION OF THE DRAWINGS

The accompanying drawings, which are incorporated in, and constitute a part of this specification, illustrate implementations of the present teachings and, together with the description, serve to explain the principles of the disclosure. In the figures.

Figure 1:
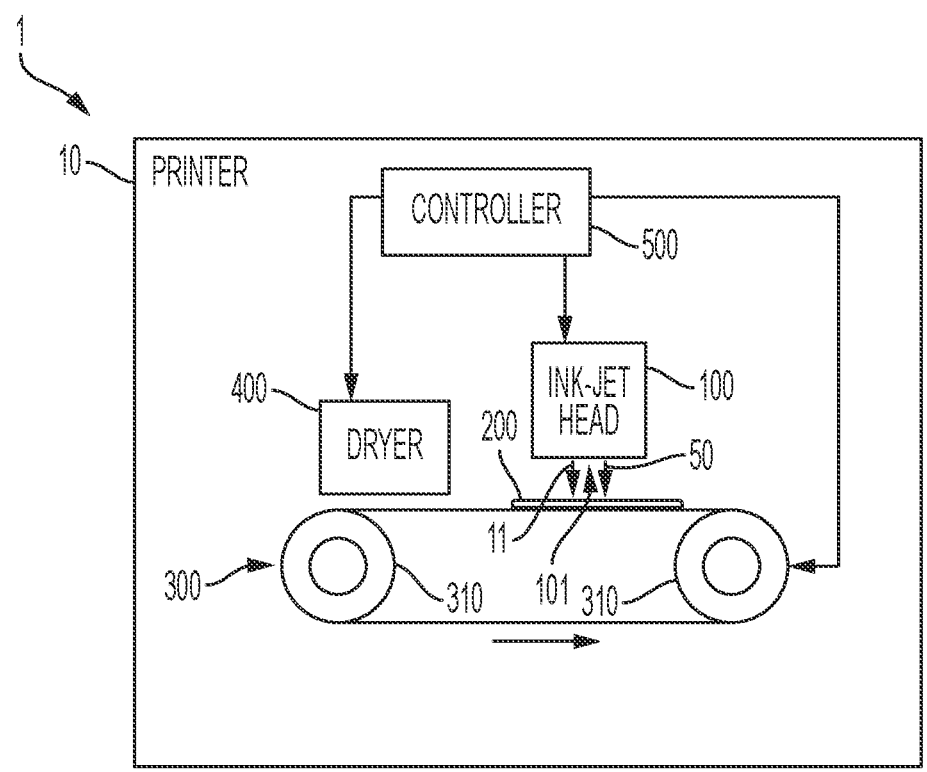
FIG. 1 illustrates an anti-curl system according to implementations of the present disclosure.

It should be noted that some details of the figures have been simplified and are drawn to facilitate understanding of the present teachings rather than to maintain strict structural accuracy, detail, and scale.

DETAILED DESCRIPTION

Reference will now be made in detail to exemplary implementations of the present teachings, examples of which are illustrated in the accompanying drawings. Generally, the same reference numbers will be used throughout the drawings to refer to the same or like parts.

Throughout the specification and claims, the following terms take the meanings explicitly associated herein, unless the context clearly dictates otherwise. Phrases, such as, "in an implementation," "in certain implementations," and "in some implementations" as used herein do not necessarily refer to the same implementation(s), though they may. Furthermore, the phrases "in another implementation" and "in some other implementations" as used herein do not necessarily refer to a different implementation, although they may. As described below, various implementations can be readily combined, without departing from the scope or spirit of the present disclosure.

As used herein, the term "or" is an inclusive operator, and is equivalent to the term "and/or," unless the context clearly dictates otherwise. The term "based on" is not exclusive and allows for being based on additional factors not described unless the context clearly dictates otherwise. In the specification, the recitation of "at least one of A, B, and C," includes implementations containing A, B, or C, multiple examples of A, B, or C, or combinations of A/B, A/C, B/C, A/B/B/B/B/C, A/B/C, etc. In addition, throughout the specification, the meaning of "a," "an," and "the" include plural references. The meaning of "in" includes "in" and "on." Similarly, implementations of the present disclosure may suitably comprise, consist of, or consist essentially of, the elements A, B, C, etc.

It will also be understood that, although the terms first, second, etc. can be used herein to describe various elements, these elements should not be limited by these terms. These terms are only used to distinguish one element from another. For example, a first object, component, or step could be termed a second object, component, or step, and, similarly, a second object, component, or step could be termed a first object, component, or step, without departing from the scope of the invention. The first object, component, or step, and the second object, component, or step, are both, objects, component, or steps, respectively, but they are not to be considered the same object, component, or step. It will be further understood that the terms "includes," "including," "comprises" and/or "comprising," when used in this specification, specify the presence of stated features, steps, operations, elements, and/or components, but do not preclude the presence or addition of one or more other features, steps, operations, elements, components, and/or groups thereof. Further, as used herein, the term "if" can be construed to mean "when" or "upon" or "in response to determining" or "in response to detecting," depending on the context.

All physical properties that are defined hereinafter are measured at 20° to 25° Celsius unless otherwise specified.

When referring to any numerical range of values herein, such ranges are understood to include each and every number and/or fraction between the stated range minimum and maximum, as well as the endpoints. For example, a range of 0.5% to 6% would expressly include all intermediate values of, for example, 0.6%, 0.7%, and 0.9%, all the way up to and including 5.95%, 5.97%, and 5.99%, among many others. The same applies to each other numerical property and/or elemental range set forth herein, unless the context clearly dictates otherwise.

Additionally, all numerical values are "about" or "approximately" the indicated value, and take into account experimental error and variations that would be expected by a person having ordinary skill in the art. It should be appreciated that all numerical values and ranges disclosed herein are approximate values and ranges. The terms "about" or "substantial" and "substantially" or "approximately," with reference to amounts or measurement values, are meant that the recited characteristic, parameter, or values need not be achieved exactly. Rather, deviations or variations, including, for example, tolerances, measurement error, measurement accuracy limitations, and other factors known to those skilled in the art, may occur in amounts that do not preclude the effect that the characteristic was intended to provide.

Unless otherwise specified, all percentages and amounts expressed herein and elsewhere in the specification should be understood to refer to percentages by weight. The percentages and amounts given are based on the active weight of the material. For example, for an active ingredient provided as a solution, the amounts given are based on the amount of the active ingredient without the amount of solvent or may be determined by weight loss after evaporation of the solvent.

With regard to procedures, methods, techniques, and workflows that are in accordance with some implementations, some operations in the procedures, methods, techniques, and workflows disclosed herein can be combined and/or the order of some operations can be changed.

As used herein, the terms "print media," "print substrate," and "print sheet" generally refer to a porous paper, usually embodied as a physical print media substrate, sheet, web, etc., for images or text, whether precut or web fed.

The terms "printer," "printing device," or "printing system" as used herein refers to a digital copier or printer, scanner, image printing machine, xerographic device, electrostatographic device, digital production press, document processing system, image reproduction machine, bookmaking machine, facsimile machine, multi-function machine, or generally an apparatus useful in performing an ink-jet print process using liquid inks or the like and can include several marking engines, feed mechanism, scanning assembly as well as other print media processing units, such as paper feeders, finishers, and the like. A "printing system" may handle sheets, webs, substrates, and the like. A "printing system" can place marks on any surface, and the like, and is any machine that reads marks on input sheets; or any combination of such machines.

As used herein, the term "aqueous liquid ink" refers to a liquid ink wherein water is a principal component. For example, a typical composition for a water-based or aqueous liquid ink includes from about 40 weight % to about 80 weight % water. In some cases, a water-based ink may include more than 50 weight % water. An aqueous liquid ink may include other solvents and components. For example, from about 20 weight % to about 50 weight % co-solvents, such as butane diol, hexanediol, glycerol, propylene glycol, PEG ethers, etc., from about 2 weight % to about 10 weight % colorant, from about 1 weight % to about 5 weight % surfactants, and from about 1 weight % to about 4 weight % of other additives, such as a wax.

The term "colorant," as used herein refers to any colorant, pigment, or dye suitable for use with a liquid ink, and configured to produce a print image after drying or fixing to a print substrate.

FIG. 1 illustrates an anti-curl system according to implementations of the present disclosure. As illustrated in FIG. 1, an anti-curl system 1 comprises a printer 10 configured to deposit a liquid ink 11 and an anti-curl composition 50 onto a print substrate 200, wherein the liquid ink 11 comprises a colorant and is configured for deposit on the print substrate 200 to form a print image, and wherein the anti-curl composition 50 does not include a colorant and is configured for deposit on a non-print area of the print substrate 200. In some implementations, the printer 10 is configured to deposit the liquid ink 11 solely on print areas of the print substrate 200, and the printer 10 is configured to deposit the anti-curl composition 50 solely on non-print areas of the print substrate 200.

The anti-curl composition 50 can be configured to be clear when dried.

In order to enhance performance of the anti-curl composition 50 and maintain the productivity of the printer 10, the anti-curl composition 50 and the liquid ink 11 can be applied with a minimum of lag time between them. For example, the liquid ink 11 and the anti-curl composition 50 can be deposited simultaneously onto the print substrate 200. In another implementation, the anti-curl composition 50 can be deposited within about 0.1 to 3 seconds of deposition of the liquid ink 11. For example, the anti-curl composition 50 can be deposited on the print substrate 200 first and the liquid ink 11 can be deposited on the print substrate 200 within about 0.1 to 3 seconds.

The anti-curl system 1 can deposit an anti-curl composition 50 on the print substrate 200 via one or more of ink-jet printing, ink jetting, ink rolling, ink misting, and combinations thereof. For example, FIG. 1 is illustrated in terms of an ink-jet printer 10. Accordingly, the printer 10 can comprise an ink-jet printer 10 comprising at least one ink-jet printing head 100.

Figure 2:
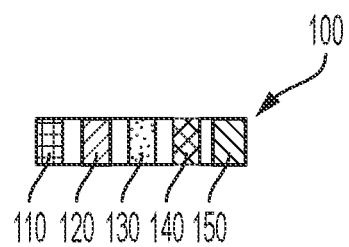
FIG. 2 illustrates an ink-jet printing head according to implementations of the present disclosure.

FIG. 2 illustrates an ink-jet printing head according to implementations of the present disclosure. As illustrated in FIGS. 1-2, the ink-jet printer 10 comprises at least one ink-jet printing head 100 configured to deposit a liquid ink 11 on a print substrate 200 and at least one ink-jet printing head 100 configured to deposit an anti-curl composition 50 on the print substrate 200. In some implementations, a single ink-jet printing head 100 is configured to deposit a liquid ink 11 and an anti-curl composition 50 on the print substrate 200. The ink-jet printer 10 further comprises an input tray (not illustrated) configured to hold sheets or rolls of the print substrate 200 to be printed on by the ink-jet printer 10. The print substrate 200 is removed from the input tray and fed onto a transport belt 310 by a transport system 300 to a position beneath the at least one ink-jet printing head 100.

The at least one ink-jet printing head 100 is configured to deposit the liquid ink 11 and the anti-curl composition 50 on the print substrate 200. The ink-jet printing head 100 can be any suitable form or type of ink-jet device, and more than one ink-jet printing head 100 may be included in the ink-jet printer 10 along with other ink-jet printer components. The liquid ink 11 deposited by the ink-jet printing head 100 can comprise one or more liquid inks. For example, the at least one ink-jet printing head 100 can deposit different types of liquid ink 11 on the print substrate 200 or the at least one ink-jet printing head 100 can deposit a similar type of liquid ink 11 on the print substrate 200, differing only in colorant. In some implementations, a plurality of ink-jet printing heads 100 can be used to separately deposit a plurality of liquid inks 11 and the anti-curl composition 50 on the print substrate 200. In other implementations, a first ink-jet printing head 100 can be used to deposit the liquid ink 11 on the print substrate 200 and a second ink-jet printing head 100 can be used to deposit the anti-curl composition 50 on the print substrate 200.

A width of the at least one ink-jet printing head 100 can correspond to a width of the print substrate 200, and the at least one ink-jet printing head 100 can deposit liquid ink 11 and anti-curl composition 50 across an entire width of the print substrate 200. In another implementation, the at least one ink-jet printing head 100 is configured to move across a width of the print substrate 200 to print an image and deposit the anti-curl composition 50.

The at least one ink-jet printing head 100 includes an ink supply (not illustrated) which may be located either within the ink-jet printing head 100 itself or may be located elsewhere and connected to the ink-jet printing head 100 through an ink conduit (not illustrated). In addition to an ink supply, the at least one ink-jet printing head 100 may include all the necessary electronics to control the deposition of liquid ink 11 and anti-curl composition 50 on the print substrate 200.

The at least one ink-jet printing head 100 includes one or more printing nozzles 101 to deposit liquid ink 11 onto the print substrate 200. For example, as illustrated in FIG. 2, an ink-jet printing head 100 includes four liquid ink printing nozzles 101 corresponding to a CMYK printhead: a cyan printing nozzle 110, a magenta printing nozzle 120, a yellow printing nozzle 130 and a black printing nozzle 140. Similarly, the at least one ink-jet printing head 100 includes one or more printing nozzles 101 to deposit the anti-curl composition 50 onto the print substrate 200. For example, as illustrated in FIG. 2, the ink-jet printing head 100 includes one anti-curl composition printing nozzle 150 to deposit the anti-curl composition 50 onto the print substrate 200.

The ink-jet printer 10 may further comprise a dryer 400 configured to wholly or partially dry the print substrate 200 after liquid ink 11 and anti-curl composition 50 is deposited on the print substrate 200. As illustrated in FIG. 1, the print substrate 200 can be fed by the transport belt 310 to the dryer 400 for drying. After the print substrate 200 has been wholly or partially dried, the print substrate 200 can exit through an output and deposited in an output tray (not illustrated). The dryer 400 can be any suitable apparatus that at least partially dries the print substrate 200, including without limitation one or more blowers to direct air at least partially toward the print substrate 200, heating apparatus to heat all or a portion of the print substrate 200, a combination heater/blower, etc.

The ink-jet printer 10 further comprises a controller 500. The controller 500 is configured to operate the at least one ink-jet printhead 100, the transport system 300, and the dryer 400 during printing operations of the ink-jet printer 10. The controller 500 can be any suitable form of hardware, software, firmware, programmable logic, or combinations thereof, whether unitary or implemented in distributed fashion in a plurality of components, wherein all such implementations are contemplated as falling within the scope of the present disclosure. The controller 500 can be configured to control a deposition of the liquid ink 11 and the anti-curl composition 50 on the print substrate 200. For example, the controller 500 can limit deposition of the liquid ink 11 to print areas of the print substrate 200. The controller 500 can also limit deposition of the anti-curl composition 50 to non-print areas of the print substrate 200. In some implementations, the controller 500 can exclude deposition of the liquid ink 11 from non-print areas of the print substrate 200.

As described above, the at least one ink-jet printing head 100 is configured to deposit the anti-curl composition 50 on the print substrate 200 in addition to the liquid ink 11.

The anti-curl composition 50 may be sufficiently similar to the liquid ink 11 that at least one of the one or more printing nozzles 101 of the ink-jet printing head 100 can be configured to deposit the anti-curl composition 50 on the print substrate 200. That is, in some implementations the one or more printing nozzles 101 can equally deposit liquid ink 11 or anti-curl composition 50 on the print substrate 200. Accordingly, the at least one ink-jet printing head 100 can equally deposit liquid ink 11 or anti-curl composition 50 on the print substrate 200.

The anti-curl composition printing nozzle 150 can be the same as the other printing nozzles 101 of the ink-jet printing head 100. For example, the anti-curl composition printing nozzle 150 can have the same mechanics and components as the other printing nozzles 101 (110, 120, 130, and/or 140) used to deposit the liquid ink 11.

The anti-curl composition 50 may be supplied to the at least one ink-jet printing head 100 similarly to the liquid ink 11. For example, the anti-curl composition 50 may be supplied via a supply located either within the ink-jet printing head 100 itself or located elsewhere and connected to the ink-jet printing head 100 through a conduit (not illustrated). The at least one ink-jet printing head 100 may include all the necessary electronics to control the deposition of the anti-curl composition 50 on the print substrate 200.

The anti-curl composition 50 is substantially similar to the liquid ink 11. For example, both the liquid ink 11 and the anti-curl composition 50 are aqueous compositions. In addition, both the liquid ink 11 and the anti-curl composition 50 each comprises a latex polymer. However, unlike the liquid ink 11, the anti-curl composition 50 does not include a colorant and is configured to be clear when dried. In some implementations, both the liquid ink 11 and the anti-curl composition 50 comprise co-solvent and surfactant.

In one implementation, the anti-curl composition 50 comprises water, co-solvent, surfactant, and latex polymer. In another implementation, the anti-curl composition 50 consists essentially of water, co-solvent, surfactant, and latex polymer. For example, the anti-curl composition 50 can comprise from about 60 weight % to about 80 weight % water, from about 20 weight % to about 40 weight % co-solvent, from about 0.5 weight % to about 2.0 weight % surfactant, and from about 0.1 weight % to about 10 weight % latex polymer, based on the total weight of the anti-curl composition 50.

In another implementation, the anti-curl composition 50 comprises from about 58 weight % to about 62 weight % water, from about 33 weight % to about 38 weight % co-solvent, from about 0.3 weight % to about 0.7 weight % surfactant, and from about 4 weight % to about 6 weight % latex polymer, based on the total weight of the anti-curl composition 50.

In yet another implementation, the anti-curl composition 50 comprises from about 58 weight % to about 62 weight % water, from about 33 weight % to about 38 weight % co-solvent, from about 0.3 weight % to about 0.7 weight % surfactant, and from about 0.7 weight % to about 1.3 weight % latex polymer, based on the total weight of the anti-curl composition 50. The water can comprise deionized water. For example, the water can consist essentially of deionized water. In all implementations, both the anti-curl composition 50 and the liquid ink 11 comprise water and are aqueous compositions.

The co-solvent can comprise one or more co-solvents. The co-solvent can be miscible in water, and the co-solvent can have a higher boiling point than water. For example, the co-solvent can comprise one or more alcohols. In one implementation, the co-solvent comprises one or more of propylene glycol, hexanediol, butanediol, pentanediol, glycerol, and mixtures and combinations thereof.

The surfactant can comprise one or more surfactants. For example, the surfactant can comprise one or more surfactants suitable for ink-jet printing, such as Surfynol AD-01, Tego Twin 4000, Tego Glide 440, and Dynol 360 available commercially from Evonik, BYK-024, BYK-019, and BYK AD01 available commercially from BYK-Chemie GmbH, and Silwet-77 available commercially from Momentive, and mixtures and combinations thereof. While in some implementations, both the anti-curl composition 50 and the liquid ink 11 comprise a surfactant, the amount and type of surfactant in the anti-curl composition 50 may be different as the anti-curl composition 50 does not have colorants and/or is configured to be clear when dried.

The latex polymer can comprise one or more latex polymers. For example, the latex polymer can comprise one or more of styrene acrylate copolymers, styrene methacrylate copolymers, acrylates copolymers, methacrylate copolymers, copolymers of a carboxylic-group-containing monomer, benzyl acrylate monomers, benzyl methacrylate monomers, polyurethanes, and mixtures and combinations thereof.

The anti-curl composition 50 can comprise the same latex polymer as the liquid ink 11 deposited by the at least one ink-jet printing head 100. For example, when the liquid ink 11 comprises more than one type of liquid ink 11, the anti-curl composition 50 can comprise the same latex polymer as at least one of the liquid inks 11 deposited by the at least one ink-jet printing head 100. In other implementations, the anti-curl composition 50 comprises a different latex polymer from the liquid ink 11 deposited by the ink-jet printing head 100. However, in all implementations, both the anti-curl composition 50 and the liquid ink 11 comprise a latex polymer.

The anti-curl composition 50 can comprise a same amount of latex polymer as at least one of the liquid inks 11 deposited by the at least one ink-jet printing head 100. In other implementations, the anti-curl composition 50 comprises a different amount of latex polymer than the liquid ink 11 deposited by the ink-jet printing head 100. For example, the amount of latex polymer in the anti-curl composition 50 may be lower as compared to the amount of latex polymer in the liquid ink 11, while still maintaining its curl-reducing properties. In one implementation, the amount of latex polymer in the anti-curl composition 50 is from about 2 to about 5 times lower than the amount of latex polymer in the liquid ink 11. For example, the amount of latex polymer in the anti-curl composition 50 is about 5 times lower, about 4 times lower, about 3 times lower, or about 2 lower than the amount of latex polymer in the liquid ink 11. Reducing the amount of polymer latex in the anti-curl composition 50 can help the transparency of the anti-curl composition 50 when dried. In addition, reducing the amount of polymer latex in the anti-curl composition 50 can be attractive from a cost perspective.

In one implementation, the anti-curl composition 50 comprises about 60 weight % water; about 25 weight % propylene glycol and about 9.5 weight % hexane diol; about 5.0 weight % polymer latex, and about 0.5 weight % BYK AD01 surfactant, based on a total weight of the anti-curl composition 50.

In another implementation, the anti-curl composition 50 comprises about 64.4 weight % water; about 25 weight % propylene glycol; about 9.5 weight % hexane diol; about 1.0 weight % polymer latex, and about 0.1 weight % BYK AD01 surfactant, based on a total weight of the anti-curl composition 50.

As described above, the liquid ink 11 can comprise one or more liquid inks 11. The liquid ink 11 is similar to the anti-curl composition 50, but includes a colorant, and is configured to form a print image when deposited on the print substrate 200. The liquid ink 11 can comprise water, co-solvent, surfactant, and latex polymer described above. In addition, the liquid ink 11 further comprises a colorant. In other implementations, the liquid ink 11 consists essentially of water, co-solvent, surfactant, latex polymer, and a colorant.

For example, the liquid ink 11 can comprise from about 40 weight % to about 80 weight % water, from about 20 weight % to about 50 weight % co-solvent, from about 2 weight % to about 10 weight % surfactant, from about 0.1 weight % to about 10 weight % latex polymer, and from about 0.01 weight % to about 5.0 weight % colorant, based on the total weight of the liquid ink 11.

Table 1 illustrates an example of the liquid ink 11 according to implementations of the present disclosure, together with a functional range for the liquid ink 11 components. As illustrated in Table 1, the liquid ink 11 can include from about 4 weight % to about 10 weight % colorant, from about 4 weight % to about 10 weight % latex polymer, from about 40 weight % to about 80 weight % water, from about 12 weight % to about 49 weight % co-solvents, and from about 1 weight % to about 4 weight % surfactant.

TABLE 1

| Component | Liquid Ink Example 1 (Wt. %) | Functional Range (Wt. %) |
|---|---|---|
| Pigment/Colorant) | 7.0% | 4-10% |
| Latex Polymer | 5.5% | 4-10% |
| Water | 53.0% | 40-80% |
| 1,2-Hexanediol (Co-Solvent) | 5.0% | 2-10% |
| Propyleneglycol (Co-Solvent) | 25.0% | 10-35% |

TABLE 1-continued

| Component | Liquid Ink Example 1 (Wt. %) | Functional Range (Wt. %) |
|---|---|---|
| Glycerol (Co-Solvent) | 2.0% | 0-4% |
| Surfactants | 2.5% | 1-4% |

The colorant can comprise one or more colorants suitable for use with liquid inks, and/or mixtures or combinations thereof. Examples of suitable dyes used as colorant can include anionic dyes, cationic dyes, nonionic dyes, and zwitterionic dyes. Examples of suitable pigments used as colorant can include black pigments, cyan pigments, magenta pigments, and yellow pigments. Pigments can be organic or inorganic particles. Suitable inorganic pigments include carbon black. However, other inorganic pigments may be suitable, such as, cobalt blue (CoO-A1203), chrome yellow (PbCrat), and iron oxide.

The anti-curl system 1 is configured to adjust the deposition of the anti-curl composition 50 according to a deposition of the liquid ink 11. For example, characteristics of the anti-curl composition 50, or parameters for the deposition of the anti-curl composition 50, can be adjusted to better control or minimize the curling of the print substrate 200 after deposition of the liquid ink 11.

The deposition of the anti-curl composition 50 can be adjusted according to the deposition of the liquid ink 11, and comprises at least one of: adjusting an amount of latex polymer in the anti-curl composition 50; adjusting a type of latex polymer in the anti-curl composition 50, adjusting a molecular weight of the latex polymer in the anti-curl composition 50, and combinations thereof. For example, the anti-curl composition 50 can include from about 2 times to about 5 times less latex polymer than the liquid ink 11. The anti-curl composition can include a latex polymer with a molecular weight higher than a latex polymer in the liquid ink 11. In some implementations, at least one of a type or an amount of latex polymer in the anti-curl composition 50 is different than a type or an amount of latex polymer in the liquid ink 11.

In another implementation, the deposition of the anti-curl composition 50 is adjusted according to the deposition of the liquid ink 11 and comprises at least one of: adjusting an amount of anti-curl composition 50 deposited on the print substrate 200 and adjusting a pattern of deposition for the anti-curl composition 50 on the print substrate 200. The anti-curl composition 50 can be deposited on the print substrate 200 at a lower density than the liquid ink 11. For example, the anti-curl composition 50 can be deposited in a deposition pattern of less dense deposition than that of the liquid ink 11 forming an image or text.

Figure 3:
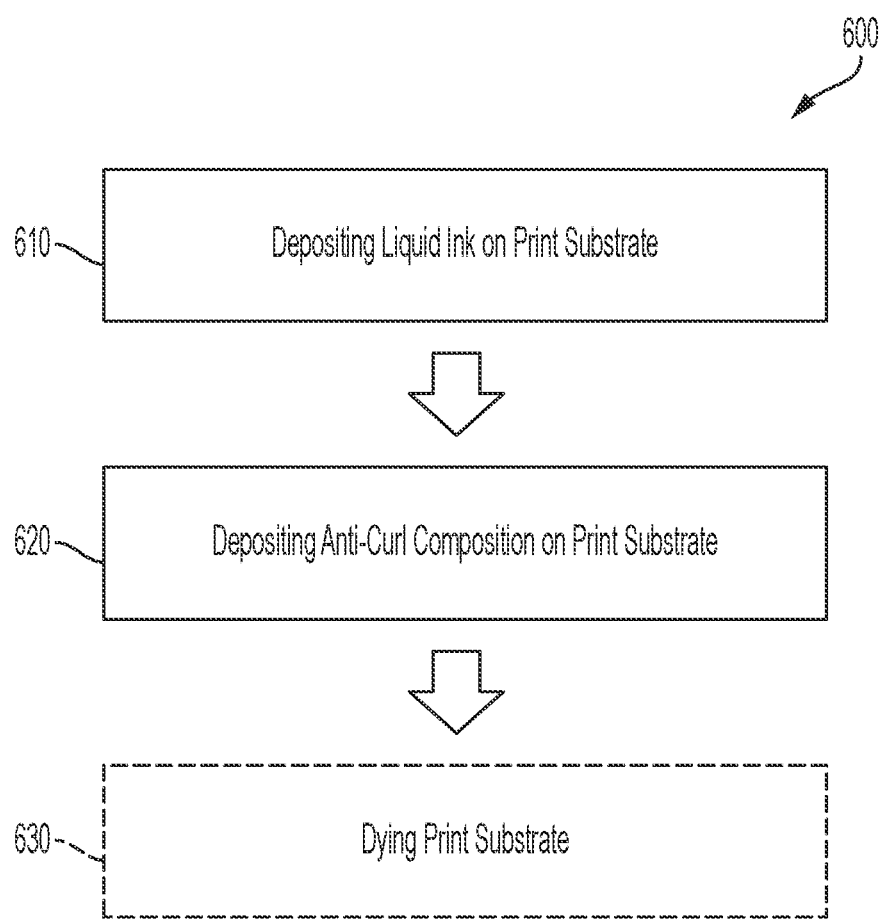
FIG. 3 illustrates a method to control curling in substrates printed with liquid ink according to embodiments of the present disclosure.

FIG. 3 illustrates a method to control curling in substrates printed with liquid ink according to embodiments of the present disclosure. FIG. 3 illustrates an example of a method that, for instance, could be used with the anti-curl system 1 described above and as illustrated in FIGS. 1-2. As such, the discussion below will reference various components as illustrated in FIGS. 1-2.

As described above, deposition of water-containing inks on a print substrate can lead to curling of the print substrate after drying. However, the inventors have developed a new method to control or minimize the curling of a substrate printed with a water-containing liquid ink. In particular, as describe in more detail below, deposition of an anti-curl composition 50 on non-print areas of a print substrate 200 can be configured to control or minimize the curl caused by deposition of a liquid ink 11 on print areas of the print substrate 200. While not being limited to any particular theory, the inventors believe that wetting the edges or other non-print areas of a print substrate with an anti-curling composition 50 according to implementations of the present disclosure can be configured to relieve stresses that would be otherwise present in the fibers of the print substrate 200 and help control or minimize curl.

As illustrated in FIG. 3, a method 600 to control curling on a print substrate comprises depositing liquid ink on a print substrate in operation 610 and depositing an anti-curl composition on the print substrate in operation 620. The method 600 may further comprise drying the print substrate in operation 630.

The liquid ink 11 can be deposited solely on print areas of the print substrate 200 and the anti-curl composition 50 can be deposited solely on non-print areas of the print substrate 200, and deposition of the anti-curl composition 50 on non-print areas of a print substrate 200 can be configured to control or minimize the curl caused by deposition of the liquid ink 11 on print areas of the print substrate 200.

The liquid ink 11 and the anti-curl composition 50 can be deposited on the print substrate 200 by any printing method capable of depositing liquids on a print substrate. For example, the liquid ink 11 and the anti-curl composition 50 can be deposited on the print substrate 200 via one or more of ink-jet printing, ink jetting, ink rolling, ink misting, and combinations thereof. The liquid ink 11 and the anti-curl composition 50 can be deposited on the print substrate 200 via a printer, such as an ink-jet printer, or other types of printers, printing devices, or printing systems capable of depositing the liquid ink 11 on a print substrate 200.

The liquid ink 11 and the anti-curl composition 50 can be deposited on the print substrate 200 at the same time or during the same printing operation in order to not slow down the printing process or have the deposition of the anti-curl composition affect the productivity of the printer. For example, the anti-curl composition 50 can be deposited on the print substrate 200 at substantially the same time as the liquid ink 11. In some implementations, the anti-curl composition 50 is deposited on the print substrate 200 simultaneously with the liquid ink 11. For example, by deposition via the same ink-jet printing head 100 at the same time. In other implementations, the anti-curl composition 50 is deposited on the print substrate 200 contemporaneously with the liquid ink 11. For example, the anti-curl composition 50 is deposited on the print substrate 200 in the same printing operation as the liquid ink 11, or deposited within about 0.1 to about 3 seconds of depositing the liquid ink on the print substrate 200. The anti-curl composition 50 can be deposited on the print substrate 200 first and then the liquid ink 11 may be deposited or vice versa.

The liquid ink 11 and the anti-curl composition 50 can be deposited on the print substrate 200 via the same apparatus. For example, the liquid ink 11 and the anti-curl composition 50 can be deposited on the print substrate 200 via an ink-jet printer 10. In some implementations, the liquid ink 11 and the anti-curl composition 50 are deposited via at least one ink-jet printing head 100 of the ink-jet printer 10. In other implementations, the liquid ink 11 and the anti-curl composition 50 are deposited via the same ink-jet printing head 100 of the ink-jet printer 10. The at least one ink-jet printing head 100 comprises one or more printing nozzles 101 configured to deposit either the liquid ink 11 or anti-curl composition 50 on the print substrate 200. The one or more printing nozzles 101 can have the same mechanics and components whether they are used to deposit the liquid ink 11 or the anti-curl composition 50.

As described above, the anti-curl composition 50 and the liquid ink 11 have similar components. For example, both the liquid ink 11 and the anti-curl composition 50 are aqueous compositions. In addition, both the liquid ink 11 and the anti-curl composition 50 comprise a latex polymer. However, unlike the liquid ink 11, the anti-curl composition 50 does not include a colorant and is instead configured to be clear when dried. The anti-curl composition 50 can comprise the same latex polymer as the liquid ink 11. Alternatively, the anti-curl composition 50 can comprise a different latex polymer than the liquid ink 11. In some implementations, both the anti-curl composition 50 and the liquid ink 11 comprise co-solvent and surfactant.

In one implementation, the anti-curl composition 50 comprises water, co-solvent, surfactant, and latex polymer, and the liquid ink 11 comprises water, co-solvent, surfactant, latex polymer, and a colorant. The liquid ink 11 can comprise one or more liquid inks 11. In other implementations, the anti-curl composition 50 consists essentially of water, co-solvent, surfactant, and latex polymer, and the liquid ink 11 consists essentially of water, co-solvent, surfactant, latex polymer, and colorant.

The anti-curl composition 50 and the liquid ink 11 can comprise the same amount water, co-solvent, surfactant, and/or latex polymer. For example, both the anti-curl composition 50 and the liquid ink 11 can comprise the same amount of water. The anti-curl composition 50 and the liquid ink 11 can comprise the same amount of co-solvent. The anti-curl composition 50 and the liquid ink 11 can comprise the same amount of surfactant. The anti-curl composition 50 and the liquid ink 11 can comprise the same amount of latex polymer.

The anti-curl composition 50 and the liquid ink 11 can comprise the same type of water, co-solvent, surfactant, and/or latex polymer. For example, both the anti-curl composition 50 and the liquid ink 11 can comprise the same water. The anti-curl composition 50 and the liquid ink 11 can comprise the same co-solvent. The anti-curl composition 50 and the liquid ink 11 can comprise the same surfactant. The anti-curl composition 50 and the liquid ink 11 can comprise the same latex polymer.

As described above, the print substrate 200 comprises a porous paper configured to accept a liquid ink 11. For example, the print substrate 200 can comprise a light or medium weight paper. Curling affects mostly lightweight paper. Accordingly, in one implementation, the print substrate 200 comprises a lightweight paper. As used herein, a lightweight paper refers to a paper with a paper weight of about 100 gsm or less. For example, the print substrate 200 can comprise a paper with a paper weight from about 60 gsm to about 100 gsm. In other implementations, the print substrate 200 comprises a paper with a paper weight of about 100 gsm or less, about 90 gsm or less, 80 gsm or less, 70 gsm or less, 60 gsm or less, or 50 gsm or less.

Figure 4:
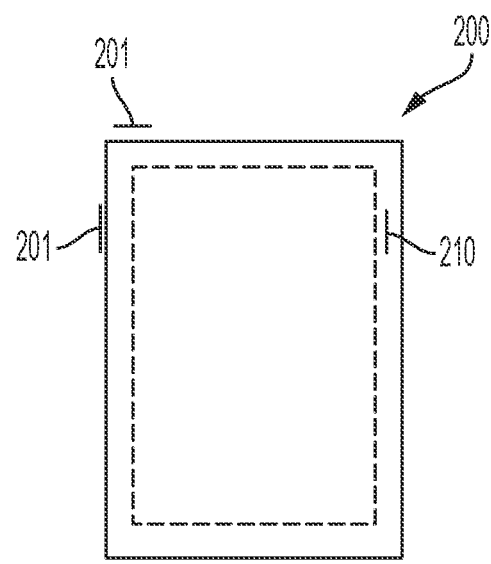
FIGS. 4-10 illustrate print substrates according to implementations of the present disclosure.
Figure 5:
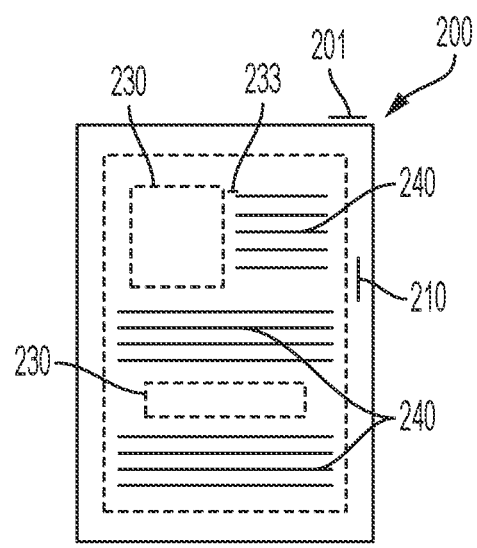

FIGS. 4-10 illustrate print substrates according to implementations of the present disclosure. As illustrated in FIGS. 4-10, the print substrate comprises print and non-print areas. For example, as illustrated in FIG. 4, the print substrate 200 can comprise a non-print margin area 210. As illustrated in FIG. 5, the print substrate 200 can also comprise one or more interior non-print areas 230 and one or more print areas 240. The non-print areas are configured for non-deposition of the liquid ink 11 and the print areas are configured for liquid ink deposition. That is, the liquid ink 11 is not deposited in non-print areas of the print substrate 200, such as the non-print margin area 210 or the interior non-print areas 230. The non-print areas would normally correspond to blank or non-printed portions of the print substrate 200. The non-print margin area 210 can include an area 1 inch or less from an edge 201 of the print substrate 200. For example, the non-print margin area 210 can include an area 0.75 inch or less, or 0.50 inch or less from the edge of the print substrate 200. In some implementations, the non-print margin area 210 can include an area 4 mm or less, 3 mm or less, or 2 mm or less from the edge 201 of the print substrate 200.

Figure 6:
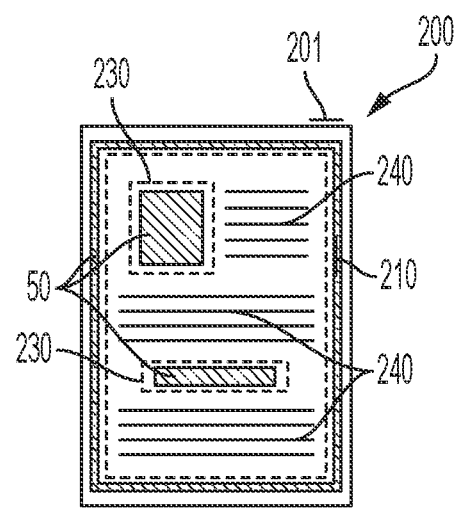
Figure 7:
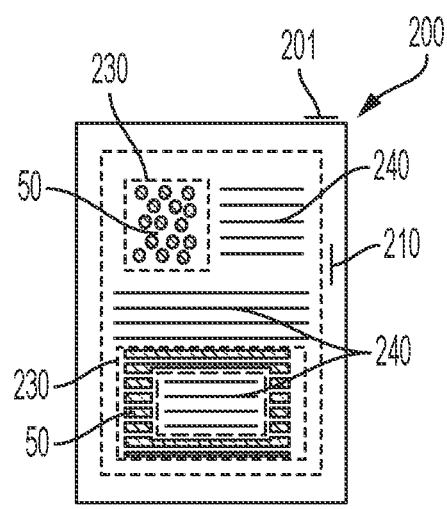

In addition to, or instead of, the non-print margin area 210, the print substrate 200 can also include interior non-print areas 230. For example, as illustrated in FIG. 5, the print substrate 200 can comprise at least one interior non-print area 230. The interior non-print area 230 defines areas of the print substrate 200 where liquid ink 11 is not deposited and would otherwise remain blank or unprinted. Interior non-print areas 230 can at least partially surround areas of the print substrate 200 where liquid ink 11 is deposited to form an image. For example, as illustrated in FIGS. 6-7, anti-curl composition 50 is deposited on the interior non-print areas 230 defined above or below, surrounding, or to a side of print areas 240. In addition, as illustrated in FIG. 6, anti-curl composition 50 is deposited on non-print margin area 210 of the print substrate 200.

In some implementations, the print substrate 200 includes a buffer region 233 between the print and non-print areas. For example, as illustrated in FIG. 5, the print substrate 200 may include a buffer region 233 of about 0.1 mm to about 1 mm separating the print and non-print areas.

In some implementations, the ink-jet printer 10 is capable of duplex or front and back printing. In such implementations, at least a portion of a back face of the printing substrate 200 is designated as a non-print area, and anti-curl composition 50 can be deposited on the back face of the printing substrate 200 via, for example, duplex printing to further control or minimize curling of the print substrate 200 after deposition of the liquid ink 11 on print areas in the front face of the print substrate 200. For example, the entire back face of the printing substrate 200 can be a non-print area.

Accordingly, depositing liquid ink on a print substrate in operation 610 comprises depositing liquid ink on print areas of the print substrate, such as print areas 240. In some implementations, depositing liquid ink on a print substrate in operation 610 does not comprise depositing liquid ink on non-print areas of the print substrate. For example, operation 610 can exclude depositing liquid ink on the non-print margin area 210 or one or more interior non-print areas 230.

The anti-curl composition 50 can be configured to prevent or minimize curling of the print substrate 200 after deposition of the liquid ink 11. For example, the deposition of the anti-curl composition 50 on the non-print areas of the print substrate 200 can be configured to control or minimize curling of the print substrate 200 after deposition of the liquid ink 11 on the print areas of the print substrate 200. Accordingly, depositing an anti-curl composition on the print substrate in operation 620 can comprise depositing the anti-curl composition 50 on non-print areas of the print substrate 200, such as the non-print margin areas 210 or interior non-print area 230.

The deposition of the anti-curl composition 50 can be adjusted according to a deposition of the liquid ink 11. For example, characteristics of the anti-curl composition 50 can be adjusted to better control or minimize the curling of the print substrate 200 after deposition of the liquid ink 11. For example, as described above, a molecular weight of the latex polymer in the anti-curl composition 50 can be higher than a molecular weight of the latex polymer in the liquid ink 11.

Adjusting the deposition of the anti-curl composition 50 can comprise adjusting the latex polymer in the anti-curling composition 50 according to the liquid ink 11 used or the deposition density of the liquid ink 11. For example, the latex polymer in the anti-curl composition 50 can be the same as the latex polymer in the liquid ink 11. The anti-curl composition 50 can used the same type and/or the same amount of latex polymer as the liquid ink 11. However, in other implementations, the amount of latex polymer in the anti-curl composition 50 can be from 2 to 5 times lower than an amount of latex polymer in the liquid ink 11, while maintaining its anti-curl properties. Using less latex polymer in the anti-curl composition 50 may enhance the clarity of the anti-curl composition 50 when dried. In some implementations, matching the latex polymer composition of the liquid ink 11 help control curling of the print substrate 200 after deposition of the liquid ink 11. For example, and while not limited to any particular theory, the inventors believe that by matching the latex polymer, the microstructure of the paper print substrate 200 may react similarly to the anti-curl composition 50 as it does the liquid ink 11, allowing changes in the paper fibers in areas of the liquid ink 11 to be balanced by areas of anti-curl composition 50, even if the same amount of polymer latex is not used.

A type of latex polymer in the anti-curl composition 50 can also be adjusted. The type of latex polymer in the anti-curl composition 50 can be a polyurethane based polymer as compared to a styrene acrylate based latex polymer in the liquid ink 11. Using a different type of latex polymer can increase the transparency of the anti-curl composition 50 when dried. For example, polyurethane based latex polymers are more transparent than styrene acrylate latex polymers when dried. In addition, using different types of latex polymer may allow use of a lesser amount of latex polymer in the anti-curl composition 50 using one type of latex polymer as compared to the liquid ink 11 using a second type of latex polymer. A molecular weight of the latex polymer in the anti-curl composition 50 can also be adjusted. The molecular weight of the latex polymer in the anti-curl composition 50 can be selected to be from about 2 to about 5 times greater than the molecular weight of the latex polymer in the liquid ink 11. For example, the molecular weight of the latex polymer in the anti-curl composition 50 can be about 500,000 and the molecular weight of the latex polymer in the liquid ink 11 can be about 100,000. A higher molecular weight of the latex polymer in the anti-curl composition 50 can allow the anti-curl composition 50 to maintain its anti-curl properties when deposited on the print substrate 200 at lower amounts when compared to the amount of liquid ink 11 deposited.

Accordingly, depositing an anti-curl composition on the print substrate in operation 620 can comprise adjusting the anti-curl composition, and adjusting the anti-curl composition can comprise at least one of: adjusting an amount of latex polymer in the anti-curl composition; adjusting a type of latex polymer in the anti-curl composition, adjusting a molecular weight of the latex polymer in the anti-curl composition, and combinations thereof.

Aspects of the deposition of the anti-curl composition 50 can also be adjusted to better control or minimize the curling of the print substrate 200 after deposition of the liquid ink 11.

In some implementations, the amount of latex polymer in the anti-curl composition 50 is from about 2 times to about 5 times higher than an amount of latex polymer in the liquid ink 11. The type of latex polymer in the anti-curl composition 50 can be different from the type of latex polymer in the liquid ink 11. For example, the anti-curl composition 50 can comprise a polyurethane latex polymer and the liquid ink 11 can comprise a styrene acrylate latex polymer. The molecular weight of the latex polymer in the anti-curl composition 50 is from about 2 times to about 5 times higher than the molecular weight of the latex polymer in the liquid ink 11. In some implementations, the deposition density of the liquid ink 11 is higher than a deposition density of the anti-curl composition 50. For example, the liquid ink 11 can be deposited at a deposition density from about 2 to about 5 times higher than a deposition density of the anti-curl composition 50. If too much anti-curl composition 50 is deposited, the print substrate 200 may curl in the opposite direction from that desired or may be visible when dried. However, if not enough anti-curl composition 50 is used, the anti-curl composition 50 may not completely decrease the curl due to deposition of the liquid ink 11 on the print substrate 200.

A pattern of deposition for the anti-curl composition 50 can also be adjusted. For example, the anti-curl composition 50 can be deposited on the non-print areas of the print substrate 200 in different patterns according to a type or amount of liquid ink 11 deposited in the print areas of the print substrate 200. In some implementations, the deposition pattern can be selected to increase or decrease a deposition density of the anti-curl composition 50 on the print substrate 200. Depositing the anti-curl composition 50 in particular patterns can help control or minimize the amount of anti-curl composition 50 composition used while providing substantial curling control, allow for deposition of the anti-curl composition 50 in small areas or areas surrounding print areas of the print substrate 200, and adjust an amount of anti-curling provided by the anti-curl composition 50 by changing the deposition pattern instead of the composition of the anti-curl composition 50.

Figure 8:
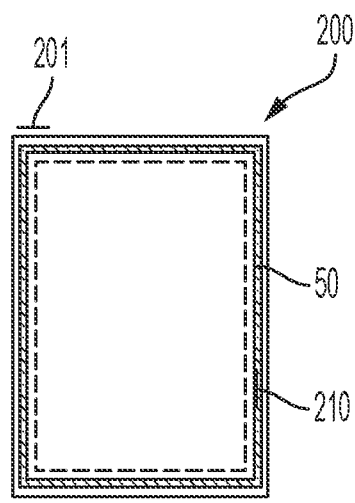
Figure 9:
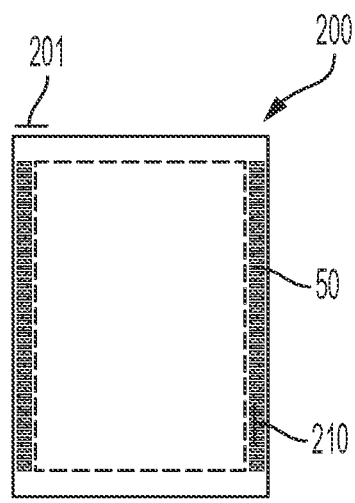
Figure 10:
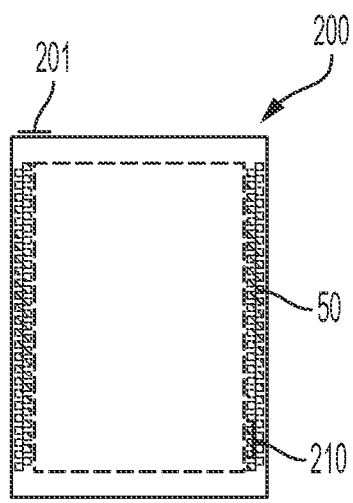

For example, as illustrated in FIGS. 6-7, the anti-curl composition can be deposited in solid, alternating, or polka-dot patters in the interior non-print areas 230 and/or the non-print margin area 210 of the print substrate 200. As illustrated in FIG. 8, the anti-curl composition 50 can be deposited in a solid pattern on the non-print margin area 210 of the print substrate 200. As illustrated in FIG. 9, the anti-curl composition 50 can be deposited in a bar-code pattern on the non-print margin area 210 of the print substrate 200, and as illustrated in FIG. 10, the anti-curl composition 50 can be deposited in a checkerboard pattern on the non-print margin area 210 of the print substrate 200. While FIGS. 6-10 illustrate various deposition patterns, the present disclosure is not limited thereto, and many other patterns or weights of deposition can be used to deposit the anti-curl composition 50 on the non-print areas of the print substrate 200.

Accordingly, depositing an anti-curl composition on the print substrate in operation 620 can comprise adjusting the deposition of the anti-curl composition, and adjusting the deposition of the anti-curl composition can comprise at least one of: adjusting an amount of anti-curl composition 50 deposited on the print substrate 200 and adjusting a pattern of deposition for the anti-curl composition 50 on the print substrate 200.

The method 600 may further comprise drying the print substrate in operation 630. Drying of the print substrate in operation 630 can include any method suitable to remove the liquid and/or solvents from the liquid ink 11 to fix the colorant to the print substrate 200. Drying the print substrate in operation 630 can comprise at least one of natural evaporation, active heating and drying, blotting, and combinations thereof.

Drying the print substrate in operation 630 can also comprise adjusting the drying of the print substrate according to a deposition of the anti-curl composition and/or a deposition of the liquid ink 11. For example, the drying method or time of the print substrate can be configured to ensure that the liquid ink 11 is dried and/or fixed completely to the print substrate 200.

The present disclosure has been described with reference to exemplary implementations. Although a few implementations have been shown and described, it will be appreciated by those skilled in the art that changes may be made in these implementations without departing from the principles and spirit of preceding detailed description. It is intended that the present disclosure be construed as including all such modifications and alterations insofar as they come within the scope of the appended claims or the equivalents thereof.

What is claimed, is:

1. An anti-curl system comprising:
a printer configured to deposit a liquid ink and an anti-curl composition onto a print substrate,
wherein the liquid ink comprises a colorant and is configured for deposit on the print substrate to form a print image,
wherein the anti-curl composition does not include a colorant and is configured for deposit on a non-print area of the print substrate,
wherein the non-print area of the print substrate comprises at least a portion of a non-print margin area configured for non-deposition of the liquid ink, and
wherein the anti-curl composition is sufficiently similar to the liquid ink such that one or more printing nozzles of the at least one ink-jet printing head can equally deposit the liquid ink and the anti-curl composition on the print substrate.

2. The system of claim 1, wherein the printer is configured to deposit the liquid ink solely on print areas of the print substrate, and wherein the printer is configured to deposit the anti-curl composition solely on non-print areas of the print substrate.

3. The system of claim 1, wherein the printer is an ink-jet printer comprising at least one ink-jet printing head, and wherein the at least one ink-jet printing head is configured to deposit the liquid ink and the anti-curl composition on the print substrate.

4. The system of claim 3, wherein the liquid ink and the anti-curl composition are deposited on the print substrate contemporaneously by the at least one ink-jet printing head.

5. The system of claim 1, wherein both the liquid ink and the anti-curl composition are aqueous compositions, wherein both the liquid ink and the anti-curl composition each comprises a latex polymer, and wherein the anti-curl composition is configured to be clear when dried.

6. The system of claim 5, wherein the anti-curl composition consists essentially of water, co-solvent, surfactant, and latex polymer, and wherein the liquid ink consists essentially of water, co-solvent, surfactant, latex polymer, and a colorant.

7. The system of claim 6, wherein the anti-curl composition and the liquid ink comprise a same type and a same amount of at least one of co-solvent, surfactant, and latex polymer.

8. The system of claim 5, wherein the anti-curl composition has from about 2 times to about 5 times less latex polymer than the liquid ink.

9. The system of claim 4, wherein the anti-curl composition is deposited at a lower deposition density on the print substrate than the liquid ink.

10. A method to control curling on a print substrate comprising:
depositing liquid ink on a print substrate, and
depositing an anti-curl composition on the print substrate,
wherein the liquid ink is deposited solely on print areas of the print substrate and the anti-curl composition is deposited solely on non-print areas of the print substrate,
where deposition of the anti-curl composition on non-print areas of a print substrate is configured to control or minimize the curl caused by deposition of the liquid ink on print areas of the print substrate,
wherein the anti-curl composition is deposited at least on a portion of a non-print margin area configured for non-deposition of the liquid ink, and
wherein the liquid ink and the anti-curl composition are sufficiently similar that they are deposited on the print substrate via a same printing apparatus using the same mechanics and components.

11. The method of claim 10, wherein the anti-curl composition is deposited on the print substrate contemporaneously with the liquid ink.

12. The method of claim 10, wherein both the liquid ink and the anti-curl composition are aqueous compositions, and wherein both the liquid ink and the anti-curl composition each comprises a latex polymer.

13. The method of claim 12, wherein the anti-curl composition does not include a colorant, and wherein the anti-curl composition is configured to be clear when dried.

14. The method of claim 13, wherein the anti-curl composition consists essentially of water, co-solvent, surfactant, and latex polymer, and wherein the liquid ink consists essentially of water, co-solvent, surfactant, latex polymer, and a colorant.

15. The method of claim 10, wherein the print substrate comprises a paper with a paper weight of about 60 gsm or less.

16. The method of claim 10, wherein depositing liquid ink on a print substrate comprises depositing liquid ink on print areas of the print substrate and does not comprise depositing liquid ink on non-print areas of the print substrate, and wherein the non-print areas of the print substrate where the anti-curl composition is deposited comprise at least one of a non-print margin area and one or more interior non-print areas.

17. The method of claim 10, wherein depositing an anti-curl composition on the print substrate comprises depositing the anti-curl composition on non-print areas of the print substrate after deposition of the liquid ink on print areas of the print substrate.

18. The method of claim 12, wherein the anti-curl composition has from about 2 times to about 5 times less latex polymer than the liquid ink.

19. The method of claim 12, wherein the anti-curl composition is deposited at a lower deposition density on the print substrate than the liquid ink.

20. The method of claim 12, wherein at least one of a type or an amount of latex polymer in the anti-curl composition is different than a type or an amount of latex polymer in the liquid ink.

* * * * *